March 28, 1967  KAZUO HIYAMA  3,311,191
COLLAPSIBLE SCAFFOLD

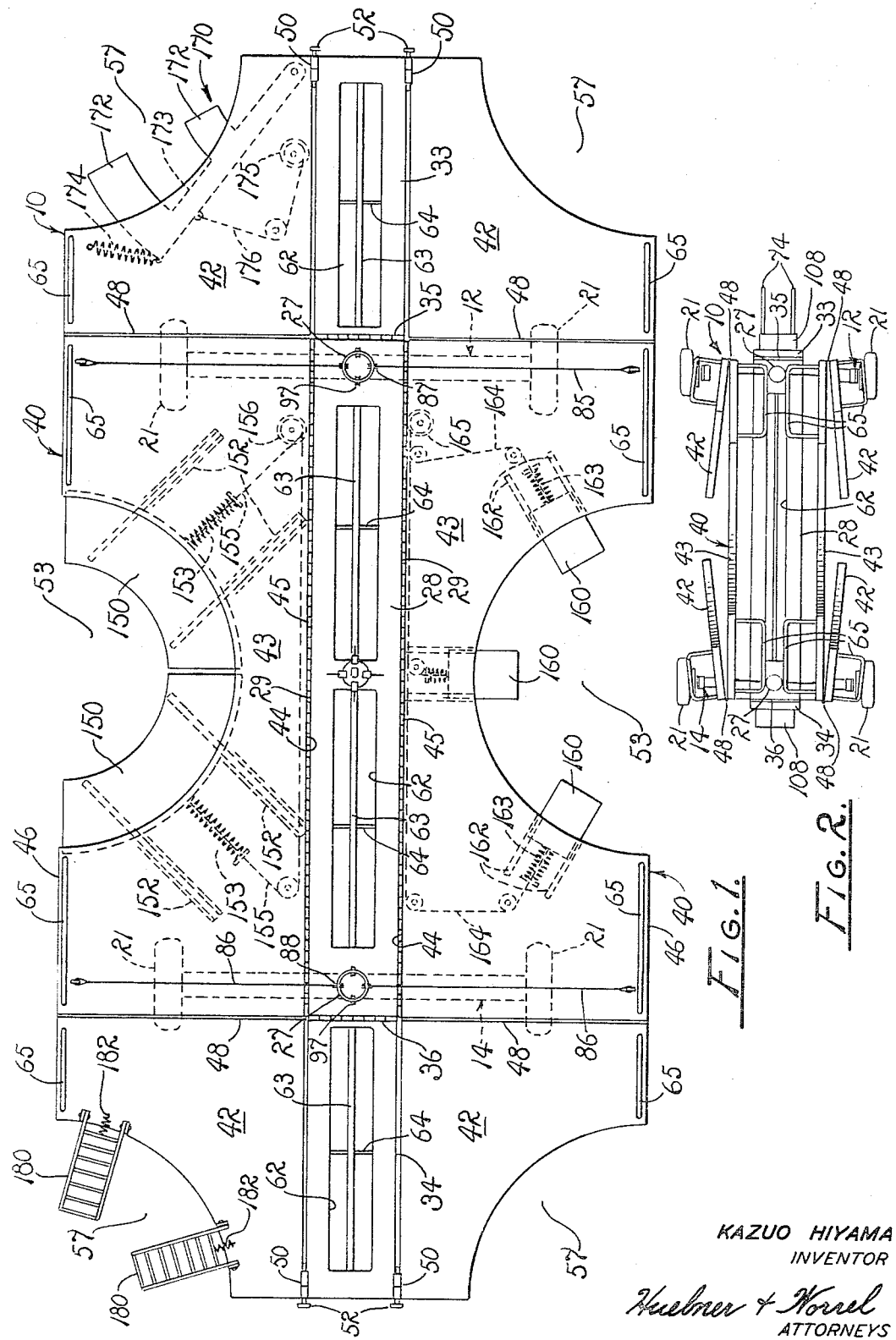

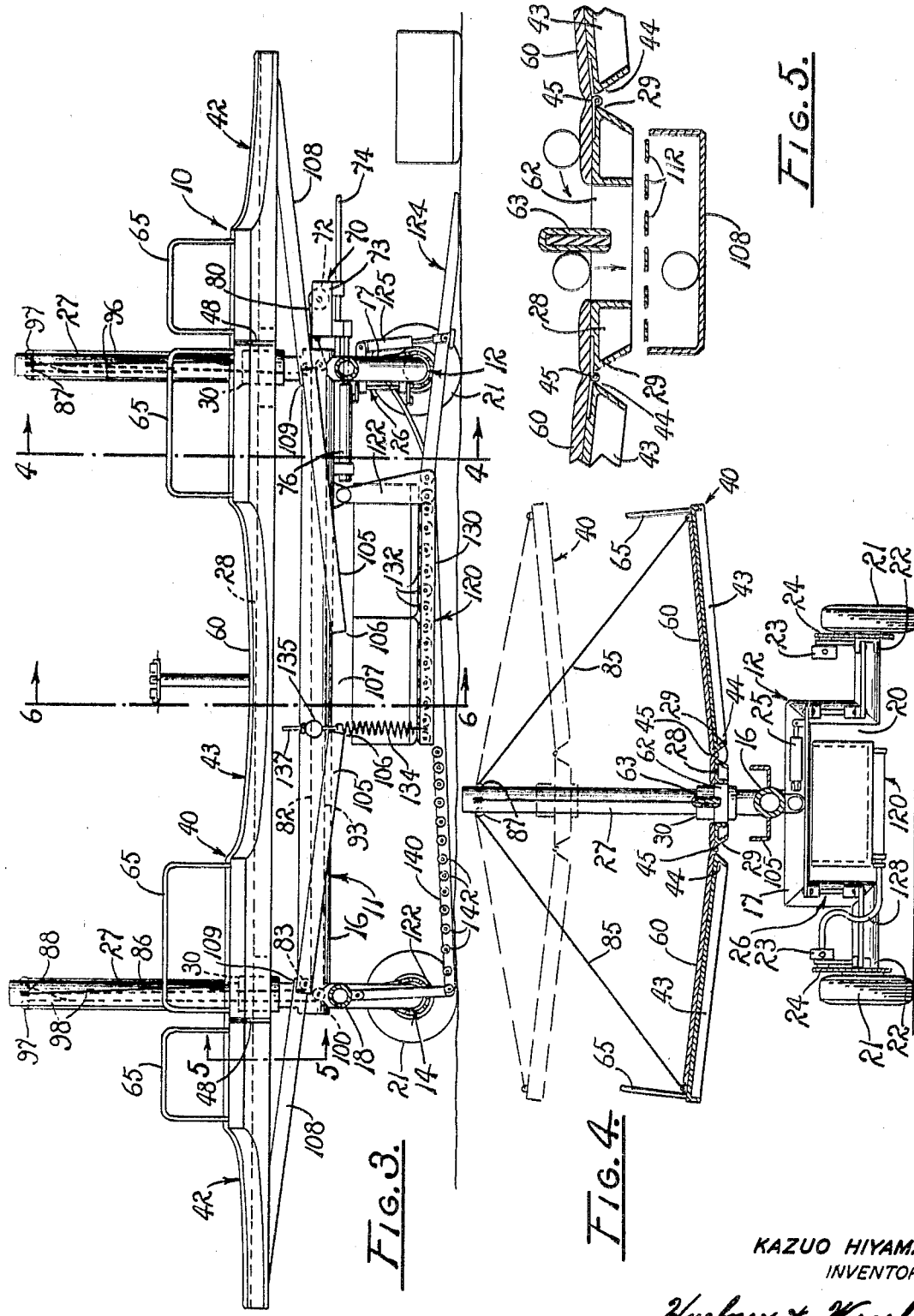

Filed July 19, 1965 3 Sheets-Sheet 3

KAZUO HIYAMA
INVENTOR

Huebner & Worrel
ATTORNEYS

United States Patent Office 3,311,191
Patented Mar. 28, 1967

3,311,191
COLLAPSIBLE SCAFFOLD
Kazuo Hiyama, 8184 E. Adams, Fowler, Calif. 93625
Filed July 19, 1965, Ser. No. 473,124
11 Claims. (Cl. 182—131)

The present invention relates to a collapsible scaffold having a mobile frame adapted to be motivated between trees in an orchard to support workmen closely adjacent to the trees and more particularly to such a scaffold providing a plurality of retracted positions for use in a wide variety of orchards of different tree configurations. In addition, the scaffold provides gravitational collection of fruit directly into shipping containers automatically positionable on the frame and automatically discharged therefrom when filled.

Previously known mobile scaffolds having foldable worker support platforms have been movable to retracted positions to facilitate their movement between upright objects such as trees in an orchard. The folding of these scaffolds is frequently restricted by the branches of the adjacent trees and therefore have only been adapted for use with a given variety of trees having a particular configuration. It is apparent that heretofore the efficient operation of the scaffolds has been dictated by the configuration of the different varieties of trees which has restricted the use of the scaffolds in certain orchards. For example, orange trees have a dense, bushy appearance with many low-hanging branches. On the other hand, peach trees provide relatively high growing branches which, unlike the orange trees, provide sufficient clearance adjacent to the ground to permit folding of the platforms. As a result, the previously known scaffolds have not been readily adapted for alternate use in all types of orchards. Furthermore, the collection of fruit on the platforms has created problems in the removal of the harvested fruit with a minimum of damage thereto. In most instances, removal of fruit from the scaffold is accomplished by hand. However, there have been attempts to mechanize the removal of fruit from the platform by chutes, conveyors, or the like which direct the fruit into a collecting box or other container on the scaffold. In order to minimize damage to the fruit, the bins must subsequently be unloaded by hand into smaller shipping boxes. It was realized that the effective operation of the scaffold could be greatly enhanced by automatically disposing the harvested fruit directly into shipping boxes carried on the frame and by providing a mechanism for automatically loading and discharging the boxes therefrom.

Although the improved collapsible scaffold of the present invention was designed specifically for use in the harvesting of fruit in orchards, it will be apparent that the scaffold is readily adapted for use in other types of elevated work near upright objects and for the collection of other objects or articles. For convenience, the description refers only to an orchard as an illustrative operational environment.

Accordingly, it is an object of the present invention to provide a collapsible scaffold of versatile adjustability to accommodate a wide range of operational requirements.

Another object is to provide a collapsible scaffold having a plurality of retracted positions for use in a wide variety of orchards.

Another object is to provide such an improved collapsible scaffold having a plurality of worker support platforms which can be folded to compact, collapsed configuration for free movement between trees in an orchard.

Another object is to provide a collapsible scaffold having a plurality of hinged support platforms which are adapted for movement with respect to each other.

Another object is to provide a collapsible scaffold having a mechanism for the synchronous movement of the platforms.

Another object is to provide a collapsible scaffold affording gravitational descent of fruit therefrom and the convenient collection and discharge of the fruit from the scaffold.

Another object is to provide a collapsible scaffold having a mechanism affording automatic pickup and discharge of fruit collecting containers from the scaffold.

Another object is to provide a collapsible scaffold having a pickup conveyor for containers to receive fruit discharged from the scaffold which is capable of automatically discharging the containers when filled.

Other objects and advantages of the present invention will subsequently become more clearly apparent upon reference to the following description and accompanying drawings.

In the drawings:

FIG. 1 is a top plan view of a scaffold embodying the principles of the present invention having a plurality of platforms disposed in an operating worker support position.

FIG. 2 is a somewhat reduced plan view of the scaffold of FIG. 1 with the platforms retracted to a compact, collapsed position.

FIG. 3 is a side elevation of the scaffold in the operating position shown in FIG. 1.

FIG. 4 is a transverse vertical section taken on line 4—4 of FIG. 3 showing the platforms disposed in an alternate dashed line elevated position.

FIG. 5 is a somewhat enlarged fragmentary transverse vertical section taken on line 5—5 of FIG. 3 through the platforms and fruit discharge chute.

Figure 6:
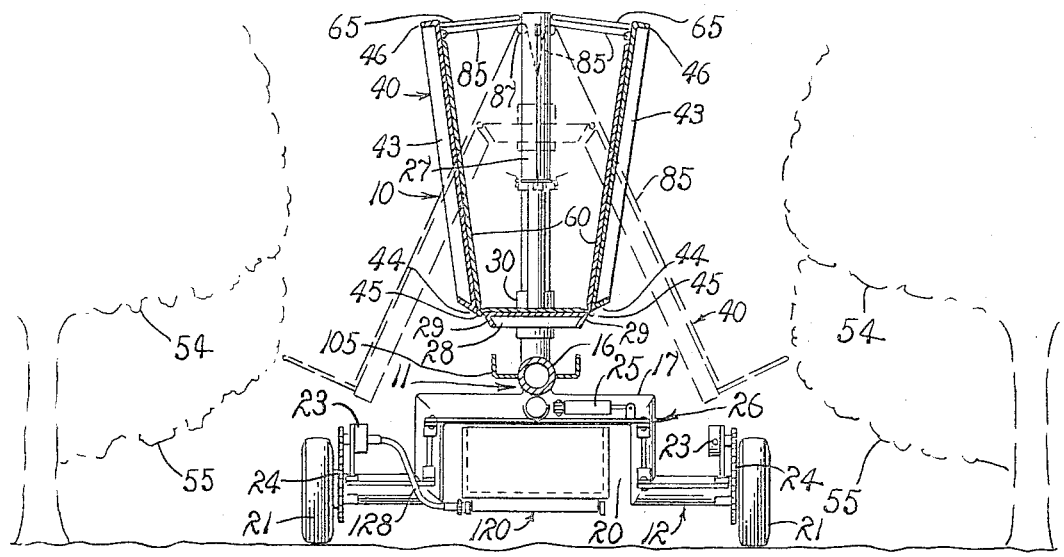
FIG. 6 is a transverse vertical section of the scaffold of the preceding figures showing the platforms in a raised retracted position with an alternately lowered retracted position shown in dashed lines.

Referring more particularly to the drawings, the scaffold of the present invention provides a worker support platform generally indicated by the reference numeral 10 which is supported on a mobile frame 11. The frame includes front and rear axles 12 and 14, respectively, which are interconnected by an elongated tube 16 disposed coextensively with the longitudinal axis of the scaffold. Each of the axles has an upwardly extended inverted U-shaped center portion 17 and 18, respectively, which is secured, as by welding or the like, individually to the opposite ends of the tube 16. The center portions of the axles thereby provide a container passage 20 longitudinally of the frame for a purpose hereinafter to be more fully described.

The frame 11 is supported for earth traversing movement on a plurality of wheels 21 individually rotatably connected to the axles through pin and clevis assemblies 22. A plurality of hydraulic drive motors 23 are individually supported on the clevis assembly adjacent to their respective wheels and are connected thereto by chain and sprocket drive assemblies 24. The wheels on the front axle 12 are steered by the extension and retraction of an hydraulic jack 25 mounted on the center portion 17 of the axle through a linkage assembly, generally indicated by the reference numeral 26. A pair of substantially upright forward and rearward tubular masts 27 are individually rigidly secured to the tube 16 respectively above the front and rear axles 12 and 14 and in a plane coextensive with the longitudinal axis of the scaffold.

The platform 10 of the present invention provides an elongated substantially horizontal center portion 28 having outer substantially parallel edges 29. A pair of tubular guide sleeves 30 are extended through the center portion of the platform and are rigidly secured thereto, as by welding or the like, in spaced positions individually circumscribing the masts 27. Each of the sleeves includes a plurality of circumferentially spaced upper and lower sets of rollers 31 having inner peripheries extended through slots 32 in the sleeves in rolling engagement with the masts to permit free elevational sliding movement of the sleeves and the center portion of the platform on the masts in its described horizontal attitude. The center portion 28 further includes opposite forwardly and rearwardly extended end sections 33 and 34, respectively, which are individually pivotally mounted on the center portion outwardly adjacent to the masts by hinge connections 35 and 36, respectively, providing an axis of rotation substantially normal to the longitudinal axis of the scaffold.

A pair of main harvesting platforms 40 individually include opposite end sections 42 and an intermediate section 43. The intermediate sections provide inner edges 44 which are individually pivotally mounted on the outer edges 29 of the center portion 28 of the platform by elongated hinge connections 45. The main harvesting platforms individually provide outer edges 46 which are elevationally swingable about the hinge connections 45. Each of the opposite end sections 42 of the main harvesting platforms is pivotally mounted on its respective intermediate sections 43 by a hinge connection 48 having an axis of rotation coextensive with the adjacent hinge connections 35 and 36 of the end sections 33 and 34 of the center portion 28 of the platform when the main harvesting platforms are disposed in substantially coplanar relation with the center portion, as viewed in FIG. 1. The end sections 42 are also pivotally mounted on their respective adjacent end sections 33 and 34 of the center portion of the platform by separable hinge connections 50 having retractable pins 52.

Each of the intermediate sections 43 of the platform has a semi-circular tree receiving well 53 extending inwardly from the outer edge 46 to a position short of the inner edges 44 for receiving the branches of the trees 54 and 55, shown in the dashed lines in FIG. 6. The end sections 42 provide similar openings 57. The upper surface of the main harvesting platforms and the center portion 28 are all provided with a foam rubber covering or other cushion material indicated by the reference numeral 60 to minimize damage to fruit dropped thereupon.

The center portion 28 of the platform 10 provides a plurality of elongated openings 62 therethrough having a plurality of elongated padded partitions 63 longitudinally extended centrally of the openings for deflecting fruit from the harvesting platforms 40 downwardly through the openings, as shown in FIG. 5. The partitions are rigidly mounted at their ends and intermediate thereof by a plurality of support brackets 64 rigidly connected to the center portion of the platform. A plurality of safety fences or side rails 65 are mounted in upstanding relation along the outer edges 46 of the main harvesting platform which, as best shown in FIG. 6, also serve as stop members by engagement with the masts 27 when the harvesting platforms are swung to an upwardly disposed retracted position.

Figure 7:
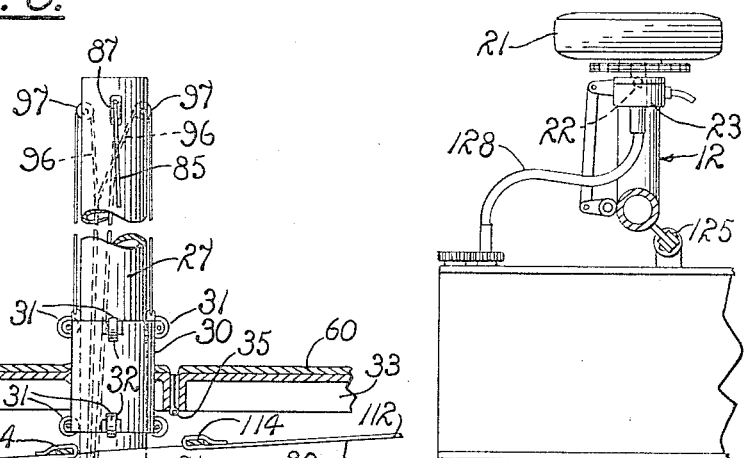
FIG. 7 is a somewhat enlarged fragmentary longitudinal central section showing one of the platform support masts and elevating mechanism for the platforms.

The main harvesting platforms 40 and the center portion 28 of the platform 10 are controlled by a winch and cable assembly generally indicated by the reference numeral 70. As best shown in FIG. 7, an hydraulically operated winch 72 is mounted on a carriage 73 in forwardly extended relation adjacent to the tube 16. The carriage is slidably mounted on a pair of elongated guide rods 74 which are rigidly mounted, as by welding or the like, at their rearward ends on the center portion 17 of the front axle 12. An hydraulic jack 76 provides a cylinder end 77 rigidly mounted beneath the tube 16 and an opposite rod end 78 extended through an opening 79 in the center portion 17 of the front axle for connection to the carriage. An elongated cable 80 is extended from the winch and is trained over a lower pulley 81 within the tube and upwardly extended therefrom through the forward mast 27. A second cable 82 is extended from the winch rearwardly through the tube 16 and is trained over a second lower pulley 83 beneath the rearward mast and the cable 82 extended upwardly therethrough. The cables 80 and 82 are divided within their respective masts to form separate end portions 85 and 86, respectively, which are individually trained over sets of upper pulleys 87 and 88 on the masts. The cables are connected at their outer ends to the main harvesting platforms in positions adjacent to their respective outer edges 46.

A pair of cables 92 and 93 are disposed within the tube 16 for elevationally controlling the center portion 28 of the platform 10. The cable 92 is connected at one end to a U-shaped anchor 94 secured to the carriage 73, is trained about a lower pulley 95 within the tube and is upwardly extended through the forward mast 27. The cable 92 is divided within the mast to provide separable end portions 96 which are individually trained over diametrically opposed upper pulleys 97 on the mast and thence downwardly therefrom for connection at their outer ends to the forward guide sleeve 30. The cable 93 is also connected to the anchor 94 and is extended rearwardly through the tube and around a pulley 100 disposed in the rearward end of the tube. The cable 93, like the cable 92, is upwardly extended through its respective mast where it is divided into separable end portions 98 individually trained over the upper pulleys 97 and thence downwardly for connection to the rearward guide sleeve 30.

A pair of downwardly inclined troughs or chutes 105 are mounted on the frame 11 beneath the elongated openings 62 in the center portion 28 of the platform 10 about the tube 16. The chutes provide lower ends 106 which are disposed in longitudinally spaced relation to form therebetween a fruit discharge opening 107. The chutes further include upper separable end portions 108 which are individually rigidly secured to their respectively adjacent end sections 33 and 34 of the center portion 28 of the platform beneath the openings 62 therein and include lower ends 109 disposed in overlapping relation with the upper ends of the chutes 105 when the platform is disposed in the operating position of FIG. 3. As best shown in FIGS. 5 and 7 a plurality of longitudinally extended transversely spaced strips 112 of plastic, canvas, or other flexible fabric material, are mounted above the chutes on transversely extended support bars 114.

Figure 8:
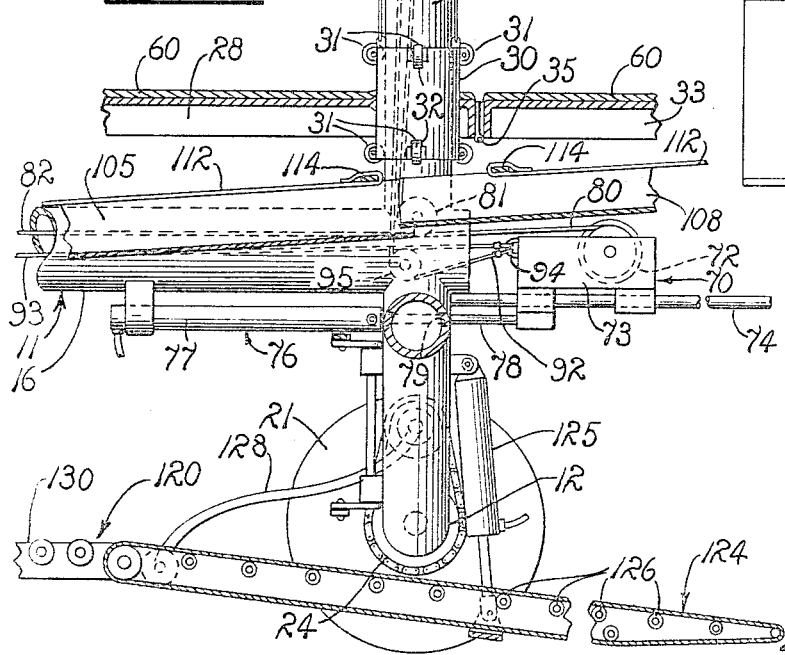
FIG. 8 is a fragmentary top plan view of the wheel mounting assembly for the scaffold.

An elongated conveyor 120 is mounted on the frame beneath the container passage 20 and beneath the chutes 105 in suspended relation by a plurality of hanger arms 122. The conveyor provides a forwardly extended ramp portion 124 which is raised and lowered by an hydraulic jack 125 extended between the ramp and the center portion 17 of the front axle 12. The ramp portion of the conveyor has a plurality of transversely extended rollers 126 which, as best shown in FIG. 8, are power driven by an elongated flexible drive shaft 128 connected to one of the wheel drive motors 23. The conveyor further includes an intermediate portion 130 which is pivotally mounted at its forward end on the hanger arm 122 and provides a plurality of transversely extended rollers 132. The opposite rearward end of the intermediate portion of the conveyor is disposed beneath the fruit discharge opening 107 of the chutes 105 and is normally maintained in a substantially horizontal position by a pair of tension springs 134 of a predetermined force. The upper ends of the springs are connected to an arm 135 transversely outwardly extended from the tube 16 by way of an eye bolt 137 adjustably mounted on the arm. The conveyor 120 provides a discharge portion 140 having a plurality of rollers 142 to receive containers from the intermediate portion 130.

As best shown in FIG. 1, various auxiliary platforms may be mounted adjacent to the tree receiving wells 53 and 57 for extension between the trees disposed therein. As shown in the upper main harvesting platform 40, a pair of arcuate auxiliary platforms 150 are mounted on elongated rails 152 secured to the lower surface of the platform. A compression spring 153 is disposed between the auxiliary platform and the main harvesting platform normally to urge the auxiliary platform to the extended position, as shown. Both of the auxiliary platforms are retracted against their respective springs by a pair of elongated cables 155 connected to an hydraulically operated winch 156. Alternatively, a plurality of individual auxiliary worker support platforms 160 may be extended inwardly of the tree receiving wells 53, as indicated on the lower main harvesting platform 40 on rails 162 secured to the underside of the platform. These auxiliary platforms are also normally extended outwardly by springs 163 and retracted through individual cables 164 wound about an hydraulically actuated winch 165. A pivoting auxiliary platform generally indicated by the reference numeral 170 is shown providing a pair of individual extension platforms 172 mounted in spaced relation upon a swingable arm 173 on one of the end sections 42 of the main harvesting platform 40. The arm is normally positioned outwardly of the platform by a spring 174 and may be retracted through actuation of an hydraulic winch 175 through a cable 176. Alternatively, a plurality of spring loaded ladders 180 may be pivotally mounted on the end sections 42 of the main harvesting platforms adjacent to the tree receiving openings 57 therein. The ladders are normally held in a substantially horizontal position by a spring 182 in coplanar relation with their respective platform section with the outer ends thereof being swingable relative to the platform upon engagement of the branches during lowering of the platform about a tree.

*Operation*

The operation of the described embodiment of the subject invention is believed to be clearly apparent and is briefly summarized at this point. When entering an orchard, the wheels 21 are driven by their respective drive motors 23 to motivate the scaffold between the rows of trees. If the scaffold is to be used in an orchard of trees having relatively high spreading branches, such as the trees 54 of FIG. 6, the platform 10 is disposed in the dashed line retracted position of FIG. 6 to permit free movement of the scaffold between the trees and beneath the branches thereof. Such position is accomplished by synchronous actuation of the hydraulic jack 76 to extend the carriage 73 outwardly from the frame on the rods 74 and actuation of the winch 72 to play out the cables 80 and 82. The cables 92 and 93 are thereby retracted into the mast 27 to raise the guide sleeves 30 and the center portion 28 of the platform to the dashed line position of FIG. 6. At the same time, the cables 80 and 82 are unwound from the winch to permit gravitational descent of the outer edges 46 of the main harvesting platforms 40 to the dashed line position inwardly of the wheels 22 of the frame.

If the orchard contains trees having low-hanging branches, such as that indicated at 55 in FIG. 6, the platform 10 is disposed in the upwardly retracted full line position of FIG. 6. Such position is obtained by synchronous lowering of the center portion 26 of the platform by retraction of the jack 76 to lower the guide sleeves 30 and by actuation of the winch 72 to wind in the cables 80 and 82.

When transporting or storing the scaffold of the present invention, the main harvesting platforms 40 and the center portion 28 of the platform 10 may be folded to the compact collapsed condition, as shown in FIG. 2. The procedure for obtaining such position is initiated by disposing the platform in its upwardly retracted full line position of FIG. 6 in the manner previously described. The pins 52 are then removed from the hinge connections 50 to permit the end sections 42 to be swung inwardly of the frame in superimposed relation to their respective intermediate sections 43. The end sections may be constrained in such position by any suitable tie member, not shown. The scaffold may then be shortened along its longitudinal length by swinging the forward and rearward end sections 33 and 34 about theier respective hinge connections 35 and 36 upwardly against their respectively adjacent masts 27.

When the scaffold is disposed between a plurality of trees in an orchard, in either of its retracted positions, the tree receiving wells 53 and 57 are aligned with the trees so that when the main harvesting platforms 40 are actuated to the operating position of FIGS. 1, 3 and 4, the wells will embrace the branches of the tree in partially circumscribing relation. If necessary to reach fruit inwardly of the tree, any of the auxiliary extension platforms 150, 160 or 170 is released for movement between the branches under the urging of their respective springs. As best shown in FIG. 4, with the platform 10 disposed in substantially horizontal position, the outer edges 46 of the main harvesting platforms are elevated somewhat above the outer edges 29 of the center portion 28. As fruit is picked from the trees, it is dropped upon the upper padded surface 60 of the platform for gravitational descent toward the center portion. The fruit is deflected downwardly through the discharge openings 62 by the padded partitions 63. The buffer strips 112 catch the fruit and permit it to roll downwardly thereupon until it works through the interstices between the strips and is gently deposited within the chute 105.

Prior to movement of the scaffold between the rows of trees in the orchard, a plurality of fruit shipping containers are deposited centrally of the rows in aligned relation with the conveyor 120. Accordingly, as the scaffold is moved between the rows, the containers are picked up by the ramp portion 124 and successively rearwardly motivated by the rollers 126 onto the intermediate portion 130 of the conveyor. Upon reaching the end of the intermediate portion, the containers are precisely located beneath the discharge opening 107 between the chutes 105 to receive the fruit being discharged through the openings 62 in the platform. When a container is filled, the weight thereof is sufficient to stretch the springs 134 to permit downward swinging movement of the intermediate portion of the conveyor. When the intermediate portion becomes aligned with the discharge portion 140, the filled container is discharged from the scaffold and the succeeding container permitted to advance in fruit-receiving relation beneath the discharge opening from the chutes.

In view of the foregoing, it is readily apparent that the structure of the present invention provides an improved collapsible scaffold which may be folded to a compact collapsed condition for easier transport and convenient storage in a minimum of space. The main harvesting platforms are easily folded to a plurality of retracted positions for adapting to different tree configurations which platforms may be conveniently extended to a substantially horizontal worker support position closely adjacent to the trees. Furthermore, the movement of the harvested fruit is controlled during its descent from the platforms by dropping upon the buffer strips, which gently deposit the fruit into the chutes for immediate discharge into shipping containers which are automatically discharged from the scaffold and which require no further handling of the fruit.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A collapsible scaffold comprising an elongated mobile frame; a support platform borne by the frame having a plurality of hinged sections movable between substantially coplanar operating positions and angularly related retracted positions; a main harvesting platform having a plurality of hinged sections pivotally mounted on said support platform for planar unitary elevational swinging movement relative to the support platform between a substantially upright retracted position, a downwardly extended retracted position and a workman support position outwardly extended from the support platform in overhanging relation to the frame; and means hingably releasably interconnecting adjacent sections of the support platform and the harvesting platform to permit folding of said sections of the harvesting platform about substantially upright axes when the harvesting platform is in said upright retracted position to dispose the platform in compact collapsed condition entirely within the frame.

2. A collapsible scaffold comprising an elongated mobile frame; a support platform extended longitudinally of the frame being elevationally positionable relative to the frame; a harvesting platform providing opposite end sections and an intermediate section with the latter pivotally connected to the support platform; first hinge means releasably interconnecting said end sections to said support platform for planar unitary elevational swinging movement with said intermediate section relative to said support platform between a substantially upright retracted position when the support platform is disposed adjacent to the frame, a downwardly extended position when the support platform is elevated with respect to the frame, and a workman support position laterally outwardly extended from the support platform in overhanging relation to the frame; and second hinge means pivotally interconnecting said end sections with said intermediate section of the harvesting platform to permit folding of said end sections against said intermediate section incident to the release of said first hinge means when the harvesting platform is in said upright retracted position to dispose the platform in compact collapsed condition entirely within the frame.

3. A collapsible scaffold comprising an elongated frame; a support platform extended longitudinally of the frame and being elevationally positionable relative to the frame and having opposite end sections pivotally mounted thereon for elevational swinging movement relative to the support platform; a harvesting platform providing opposite end sections and an intermediate section with the latter pivotally connected to the support platform intermediate said end sections of the support platform; first hinge means releasably interconnecting said end sections of the harvesting platform with their adjacent end sections of the support platform for planar unitary elevational swinging movement with said intermediate section relative to said support platform between a substantially upright retracted position when the support platform is disposed adjacent to the frame, a downwardly extended retracted position when the support platform is elevated with respect to the frame, and a workman support position laterally outwardly extended from the support platform in overhanging relation to the frame; and second hinge means pivotally interconnecting said end sections of the harvesting platform with said intermediate section to permit folding of said end sections against said intermediate section and to permit raising of the end sections of the support platform incident to the release of said first hinge means when the harvesting platform is in said upright retracted position to dispose the platform in compact collapsed condition entirely within the frame.

4. A collapsible scaffold comprising an elongated mobile frame having a longitudinal axis; a substantially horizontal center support platform extended longitudinally of the frame having laterally opposed parallel edges disposed in coextensive relation to said axis for elevational movement relative to the frame in said horizontal attitude; a pair of main harvesting platforms individually providing opposite inner and outer edges, opposite end sections and an intermediate section with the inner edge of each intermediate section being pivotally connected to its respective adjacent edge of the support platform; first hinge means releasably interconnecting said end sections with their respective adjacent edge of the support platform for planar unitary elevational swinging movement with their respective intermediate section relative to said support platform between substantially upright retracted positions when the support platform is disposed adjacent to the frame, downwardly extended positions when the support platform is elevated with respect to the frame, and workman support positions laterally outwardly extended from the support platform in overhanging relation to the frame; and second hinge means pivotally interconnecting said end sections with their respective intermediate section of the harvesting platforms to permit folding of said end sections against their respective intermediate section about substantially vertical axes incident to the release of said first hinge means when the harvesting platforms are in said upright retracted positions to dispose the platforms in compact collapsed condition entirely within the frame.

5. A collapsible scaffold comprising an elongated frame having a longitudinal axis; a substantially horizontal center support platform extended longitudinally of the frame having laterally opposed parallel edges disposed in coextensive relation to said axis for elevational movement relative to the frame in said horizontal attitude, said platform including opposite end sections pivotally mounted thereon for elevational swinging movement; a pair of main harvesting platforms individually providing opposite inner and outer edges, opposite end sections and an intermediate section with the inner edge of each intermediate section being pivotally connected to its respective adjacent edge of the support platform; first hinge means releasably interconnecting said end sections of the harvesting platform with their adjacent end sections of the support platform in substantially planar relation for unitary elevational swinging movement with their respective intermediate sections relative to said support platform between a substantially upright retracted position when the support platform is disposed adjacent to the frame, a downwardly extended retracted position when the support platform is elevated with respect to the frame, and a workman support position laterally outwardly extended from the support platform in overhanging relation to the frame; second hinge means pivotally interconnecting said end sections of the harvesting platform with their respective intermediate sections to permit folding of said end sections against their intermediate sections about substantially vertical axes and to permit raising of the end sections of the support platform incident to the release of said first hinge means when the harvesting platform is in said upright retracted position to dispose the platform in compact collapsed condition entirely within the frame.

6. A collapsible scaffold comprising an elongated frame having a longitudinal axis; a plurality of elongated masts rigidly upwardly extended from the frame in longitudinally spaced relation to each other and in a substantially common erect plane coextensive with said longitudinal axis thereof; a substantially horizontal center support platform slidably mounted on said masts providing laterally opposed parallel edges and including opposite end sections pivotally mounted thereto outwardly of the masts; powered means on the frame for elevationally positioning said support platform on the masts relative to the frame in said horizontal attitude; a pair of main harvesting platforms individually providing opposite inner and outer edges, opposite end sections and an intermediate section with the inner edge of each intermediate section being pivotally connected to its respective adjacent edge of the support platform; first hinge means releasably interconnecting said end sections of the harvesting platform with their adjacent end sections of the support platform in substantially planar relation for unitary elevational swinging movement with their respective intermediate sections relative to said support platform; control means borne by the frame and the masts connected to the harvesting platforms in outwardly spaced relation to their respective inner edges for positioning the harvesting platforms between a substantially upright retracted position when the support platform is disposed adjacent to the frame, a downwardly extended retracted position when the support platform is elevated with respect to the frame, a workman support position laterally outwardly extended from the support platform in overhanging relation to the frame; second hinge means pivotally interconnecting said end sections of the harvesting platform with their respective intermediate sections to permit folding of said end sections against their intermediate sections about substantially vertical axes and to permit raising of the end sections of the support platform incident to the release of said first hinge means when the harvesting platform is in said upright retracted position to dispose the platforms in compact collapsed condition entirely within the frame.

7. The scaffold of claim 6 wherein said control means includes a winch mounted on the frame, pulleys mounted on the masts, cables trained over the pulleys and respectively interconnecting the winch and said support platform and said harvesting platforms outwardly of their inner edges.

8. The scaffold of claim 7 wherein the winch is borne by a carriage slidably mounted on the frame with said power means interconnecting the frame and the carriage for extension and retraction of the carriage, and synchronous control means for actuating the winch elevationally to adjust the harvesting platforms, to extend and retract said powered means for shifting the carriage and elevationally to adjust the support platforms.

9. The scaffold of claim 6 wherein said support platform includes an opening therethrough to receive objects placed upon the harvesting platforms which in said workman support position are disposed in upwardly inclined relation from the support platform, article guide means mounted on the frame beneath said opening in the support platform having a discharge opening on the frame, and conveyor means mounted on the frame beneath the guide means for positioning containers beneath the discharge opening and to exhaust such containers from the frame when filled.

10. A collapsible scaffold comprising an elongated mobile frame; a support platform borne by the frame for movement between a lower position adjacent to the frame and an upper position elevationally spaced from the frame and having a plurality of hinged sections movable between substantially coplanar operating positions and angularly related retracted positions; and a main harvesting platform having a plurality of hinged sections pivotally mounted on said support platform for planar unitary elevational swinging movement relative to the support platform between a substantially upright retracted position when the support platform is disposed in said lower position, a downwardly extended retracted position when the support platform is disposed in said upper position and a workman support position outwardly extended from the support platform in overhanging relation to the frame.

11. A collapsible scaffold comprising an elongated mobile frame; a support platform borne by the frame for movement between a lower position adjacent to the frame and an upper position elevationally spaced from the frame and having a plurality of hinged sections movable between substantially coplanar operating positions and angularly related retracted positions; a main harvesting platform having a plurality of hinged sections pivotally mounted on said support platform for planar unitary elevational swinging movement relative to the support platform between a substantially upright retracted position when the support platform is disposed in said lower position, a downwardly extended retracted position when the support platform is disposed in said upper position and a workman support position outwardly extended from the support platform in overhanging relation to the frame, and means hingably connecting adjacent sections of the support platform and the harvesting platform to permit said adjacent sections to pivot relative to each other during said movement of the harvesting platform between its upper and lower retracted positions, said means being movable to a retracted position to release said adjacent sections of the support platform and the harvesting platform to permit folding of said sections of the harvesting platform about substantially upright axes when the harvesting platform is in said upright retracted position to dispose the platform in compact collapsed condition entirely with the frame.

References Cited by the Examiner
UNITED STATES PATENTS

| | | | |
|---|---|---|---|
| 563,668 | 7/1896 | Lesser | 108—77 X |
| 1,969,190 | 8/1934 | Wagner | 108—77 |
| 3,072,217 | 1/1963 | Hiyama | 182—223 X |
| 3,191,717 | 6/1965 | Hiyama | 182—131 |

REINALDO P. MACHADO, *Primary Examiner.*